Patented May 21, 1940

2,201,544

UNITED STATES PATENT OFFICE 2,201,544

POLYMERIC CONDENSATION PRODUCTS

Carl S. Marvel, Urbana, Ill., and Donald S. Frederick, Swarthmore, Pa.; said Frederick assignor to said Marvel No Drawing. Application October 2, 1937, Serial No. 166,944

9 Claims. (Cl. 260—94)

This invention relates to polymeric condensation products and, more particularly, to the process of preparing olefin-sulfur dioxide polysulfones. This application is a continuation-in-part of applicants' copending applications Serial No. 77,022, now U. S. Patent 2,169,363 dated August 15, 1939, entitled "Carbon compounds," and Serial No. 77,252, now U. S. Patent 2,136,389 dated November 15, 1938, entitled "Carbon compounds."

Heretofore, considerable work has been done on polymeric condensation products of sulfur dioxide and olefins but the existing processes for their preparation are characterized by poor yields, troublesome manipulations, and failure to give reproducible results. Consequently, none of these processes has been adapted for large scale production of olefin-sulfur dioxide polymers.

An object of the present invention is to provide an improved process for preparing olefin-sulfur dioxide condensation products. A further object is to provide a process adapted to give light colored, stable polysulfones from olefins and sulfur dioxide. A further object is to produce such condensation products in better yields than have heretofore been obtainable. A still further object is to provide a simple and economical process which will give reproducible results. Other objects of the invention will be apparent from the description given hereinafter.

The above objects are accomplished according to the present invention by reacting sulfur dioxide with a mono-olefin containing at least two ethylenic hydrogen atoms and in which the ethylenic linkage is within two carbon atoms of the end of the carbon chain, in the presence of a peroxide-containing catalyst and a monomeric alcohol miscible with the reactants and liquid at the reaction temperature.

The type of olefin to which the invention relates is, as defined above, a mono-olefin, having at least two ethylenic hydrogen atoms, in which mono-olefin the ethylenic linkage is situated between the first and second, or the second and third carbon atoms, i. e., in the −1 or the −2 position in the carbon chain. Of the olefins of this type, a sub group particularly advantageously adapted for use in the present invention comprises those mono-olefins having the formula $$\begin{matrix} HC=CH \\ | \quad | \\ Y \quad Z \end{matrix}$$

in which Y represents a radical from the group consisting of hydrogen, methyl, and hydroxy methyl, and, with Z, a saturated divalent hydrocarbon radical containing less than 7 carbon atoms, and Z represents a radical from the group consisting of hydrogen and alkyl radicals, and, with Y, a saturated divalent hydrocarbon radical containing less than 7 carbon atoms.

An essential part of the present invention lies in the discovery that alcohols, while not exerting in themselves any positive catalytic effect upon the olefin-sulfur dioxide reaction, have a marked effect as adjuvants or promoters for the peroxide-containing catalysts, increasing their activity, improving the yields of condensation products, and insuring the formation of condensation products which are more nearly white and more stable than those formed in the absence of alcohol.

Any monomeric alcohol miscible with the reactants and liquid at the reaction temperature may be employed. The alcohol may be primary, secondary, or tertiary, and may belong to any one of the aliphatic, cycloaliphatic, or aromatic series. The lower saturated aliphatic alcohols having up to and including about 6 carbon atoms have been found most satisfactory. Such alcohols include methanol, ethanol, propanol, isopropanol, butanol, isobutanol, glycol, secondary amyl alcohol and glycerol. Other alcohols which may be used include benzyl and parabromobenzyl alcohols, and cyclohexanol.

The alcohols are used in conjunction with peroxide-containing catalysts such as hydrogen peroxide, usually employed as an aqueous solution, various organic peroxides, such as benzoyl peroxide, acetyl benzoyl peroxide, dibutyryl peroxide, dilauryl peroxide, ascaridole, acetone peroxide, urea peroxide, and monoperphthalic acid. The so-called "aged" aldehydes, i. e., aldehydes which have been permitted to stand in the air for at least 4 or 5 days and preferably for at least two weeks, also function as catalysts, though on the whole somewhat less effectively. While it is not an absolute certainty, there is little reason to doubt that this is due to formation of peroxides, one reason being that freshly distilled aldehydes, while they have some catalytic effect, are much less effective than aldehydes which have been exposed to atmospheric oxidation for several months. The apparent reason is that they contain only very small amounts of peroxides. Aldehydes of the type $(R(CHO)_X)_Y$ where R is a hydrocarbon radical, X is an integer less than 3, and Y an integer less than 4, are particularly satisfactory. Specific aldehydes suitable as catalysts include paraldehyde, n-heptaldehyde, benzaldehyde, paraformaldehyde, and terephthaldehyde.

As those skilled in the art will appreciate, not all of these peroxide-containing catalysts are exact equivalents in their catalytic power, some of them being more effective for one particular reaction than for another.

The sulfur dioxide employed may be ordinary commercial grade although, if desired, it may be purified by bubbling through concentrated sulphuric acid.

The olefin-sulfur dioxide condensation products are advantageously prepared according to the present invention by simply mixing the liquid olefins and liquid sulfur dioxide together with catalytic proportions of the peroxide-containing catalysts and relatively small proportions of the alcohol in a pressure reaction vessel which is then sealed and allowed to stand while the reaction mixture comes back to ordinary room temperature. The reaction mixture is then treated in any suitable manner to isolate the condensation product.

The following examples are given to illustrate specific embodiments of the invention; the quantities, unless otherwise noted, being expressed as parts by weight:

*Example I.*—To 45.5 parts of cyclohexene in a pressure vessel cooled in a solid carbon dioxide-acetone bath was added 56 parts of sulfur dioxide. A solution of 5 parts of paraldehyde (aged by allowing to stand in the open until it contained about 0.05–0.06 part of peroxide expressed as weight of hydrogen peroxide) in 15 parts of 95% ethanol was then added. The ingredients were mixed, the vessel closed, and allowed to stand at room temperature for seven days. A viscous, colorless, slightly turbid solution formed during the first day and then gradually separated into two colorless layers, the lower and larger one being viscous and slightly turbid. On the seventh day the vessel was cooled, opened, and the viscous liquid was poured into about 216 parts of ether with stirring. A white, amorphous precipitate formed which was filtered and dried. A yield of 33 parts of cyclohexene polysulfone was obtained, this being 40.5% of the theoretical yield. The condensation product was soluble in dioxan, chloroform, hot toluene, and hot tetrahydronaphthalene. When heated at 160° C. in a compression mold it gave a semi-transparent article.

Example I was repeated except that 40 parts of cyclohexene were used and no alcohol was added. The reaction mixture turned brown within 15 minutes after it had been removed from the cooling bath. After standing for eight days at room temperature the reaction mixture was a dark brown liquid of very low viscosity. From it only 5 parts (7% of the theoretical yield) of a dirty white amorphous condensation product could be isolated.

*Example II.*—A pressure vessel, cooled in a solid carbon dioxide-acetone bath, was charged with 142 parts of a mixture of butene-1 and butene-2 (made by thermal dehydration of n-butyl alcohol), 167 parts of sulfur dioxide, and 1.4 parts of benzoyl peroxide dissolved in 27 parts of warm absolute alcohol. The vessel was sealed and allowed to stand at room temperature for four days. During this time a resin separated as a white, partly fused mass. The vessel was then opened and the volatile matter allowed to escape. The resin formed was purified by dissolving in about 1526 parts of chloroform, followed by precipitation with ether. After drying, the weight of white amorphous resin was 205 parts or 67% of the theoretical yield. The resin was soluble in acetone and dioxan as well as chloroform and the viscosity of a 10% solution of the resin in dioxan at 25° C. was 10.5 poises. When heated at 160° C. in a compression mold, this resin gave a colorless, semi-transparent, tough article.

Following substantially the above procedure but using toluene as a solvent for the catalyst instead of ethanol, only a 5% yield of polymer, which had a yellow cast, was obtained. This shows that the ethanol both improved the color of the condensation product and tremendously improved the yield.

The procedure of Example II was repeated using 39 parts of the same mixed butene, 45 parts of sulfur dioxide, and 0.5 part of acetyl benzoyl peroxide dissolved in 12 parts of warm absolute ethanol. The vessel was allowed to stand for seven days at room temperature. A yield of 56 parts of white amorphous polymer was obtained, this yield amounting to 67% of the theoretical yield.

The procedure of Example II was again carried out using 42 parts of the mixed butenes, 43 parts of sulfur dioxide, and 0.5 part of dibutyryl peroxide dissolved in 12 parts of absolute ethanol. A yield of 60 parts, or 74% of the theoretical yield, was obtained.

Dilauryl peroxide was substituted for the dibutyryl peroxide and a 61.5% yield of white amorphous polymer was obtained.

*Example III.*—Sixteen parts of cyclohexene, 4 parts of ethyl alcohol, and 1 part of aged paraldehyde containing appreciable amounts of peroxides were placed in a pressure vessel, the mixture cooled to —50° C. and 29 parts of liquid sulfur dioxide added. The vessel was closed, allowed to stand for 24 hours at room temperature, cooled to —20° C., and opened. The reaction product, a viscous mass, was dissolved in 76 parts of chloroform and the polymer was precipitated by the addition thereto of a large volume of diethyl ether. The polymer was filtered, dried, powdered, washed thoroughly with diethyl ether, again filtered and finally dried. A yield of 11.9 parts was obtained. The same procedure, except that the alcohol was omitted, gave a yield of only 4 parts and, when both alcohol and aldehyde were omitted, practically no polymer at all was obtained. The addition of a little dibutyl phthalate to a solution of the resulting cyclohexene polysulfone in chloroform gives a solution which, when flowed out on glass or metal surfaces and allowed to dry, forms a soft, flexible film.

*Example IV.*—Following the procedure of Example III but substituting 4 parts of normal butyl alcohol for the ethyl alcohol, a yield of 8 parts of the cyclohexene polysulfone was obtained.

*Example V.*—Following the procedure of Example III except that 2 parts of comparatively fresh benzaldehyde was used as the catalyst, a yield of 7 parts of the condensation product was obtained.

The procedure was repeated using 1 part of benzaldehyde that had stood for several months in a loosely stoppered bottle, and a yield of 28 parts was obtained. This shows clearly the effect of prolonged ageing in increasing the activity of the aldehyde catalyst.

*Example VI.*—The procedure of Example III was carried out using 22 parts of glycol in place of the ethyl alcohol. A yield of 28 parts of cyclohexene polysulfone was obtained.

*Example VII.*—The procedure of Example III was carried out using 0.5 parts of aged paraformaldehyde as the catalyst instead of paraldehyde. A yield of 8.5 parts resulted.

*Example VIII.*—The procedure of Example III was carried out twice using 2 parts and 1 part, respectively, of terephthalaldehyde as the catalyst, with yields of 11.5 and 7.0 parts, respectively, being obtained.

*Example IX.*—The procedure of Example III was carried out using 10 parts of benzyl alcohol to replace the ethyl alcohol. A yield of 6.0 parts of the condensation product was obtained.

*Example X.*—A procedure substantially as set forth in Example II was carried out using 50 parts of mixed n-butene, 64 parts of sulfur dioxide, 0.5 part of benzoyl peroxide, and 9.4 parts of methanol. The reaction vessel was allowed to stand for 6 days at room temperature. A yield of 80 parts, 74% of the theoretical yield, of the condensation product was obtained.

*Example XI.*—Eleven parts of propene, 1 part of aged paraldehyde, and 4 parts of ethyl alcohol were placed in a pressure vessel, cooled to −50° C., and 28.7 parts of liquid sulfur dioxide added. After standing for 20 hours at room temperature, the vessel was cooled to −20° C., opened, and the propene-sulfur dioxide polymer purified and dried as set forth in the preceding examples. A yield of 23 parts of the polymer was obtained.

When the alcohol was omitted in the above procedure, only about one-half part of polymer was obtained. When the paraldehyde was omitted, no polymer was obtained at all, as was also true when neither alcohol nor paraldehyde was present. This shows that the catalyst is required to produce a reaction and that the alcohol, while in itself having no catalytic effect, has some kind of cooperative effect with the catalyst which results in much higher yields.

*Example XII.*—A cooled mixture consisting of 16.2 parts of cyclohexene, 4 parts of 95% ethanol, and 3 parts of 2% aqueous hydrogen peroxide was mixed with 28.7 parts of liquid sulfur dioxide, placed in a closed pressure container and allowed to stand at room temperature for 24 hours. The container was then cooled to about −20° C., opened, and the viscous mass remaining in the container was dissolved in 76 parts of chloroform. The condensation product was then recovered, purified, and dried as above. A yield of 27 parts (93% of the theoretical) was obtained. Analysis of the product showed that it contained 21.46% sulfur. The calculated amount of sulfur present in a product of the formula

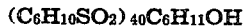

$(C_6H_{10}SO_2)_{40}C_6H_{11}OH$ is 21.9%.

The following examples illustrate the use of two or more peroxide-containing catalysts in the present invention.

*Example XIII.*—Sixteen parts of cyclohexene, 28.7 parts of sulfur dioxide, 3 parts of 3% hydrogen peroxide, 4 parts of ethyl alcohol, and 1 part of paraldehyde aged by standing in a loosely stoppered bottle for several months, were placed in a pressure vessel which was then sealed and brought to room temperature over a period of several hours. The reaction product was then isolated as described above, a yield of 32 parts being obtained. The procedure carried out with the omission of the alcohol resulted in the formation of only 11 parts of polymer.

*Example XIV.*—Thirteen parts of liquid pentene-2, 28.7 parts of liquid sulfur dioxide, 1 part of aged paraldehyde, 4 parts of ethyl alcohol, and 3 parts of 3% hydrogen peroxide, were placed in a pressure vessel which was then sealed and brought to room temperature over a period of several hours. The condensation product after isolation weighed 15 parts.

*Example XV.*—A mixture of 9.1 parts of styrene, 14.4 parts of liquid sulfur dioxide, 1.6 parts of ethyl alcohol, 0.1 part of 30% hydrogen peroxide, and 5 parts of aged paraldehyde, was placed in a pressure vessel and allowed to stand for 15 hours at room temperature. The yield of the styrene-sulfur dioxide polymer, after isolation, was 2.5 parts. The product darkened on heating and melted with decomposition at 188–190° C. It was slightly soluble in acetone but insoluble in most other common organic solvents. Upon analysis it was found to contain 18.64% sulfur, whereas the calculated amount for a product of the formula $(C_8H_8SO_2)_n$, where $n$ is any positive integer, is 19.05%.

*Example XVI.*—A mixture of 7 parts of octene-1, (obtained by the catalytic dehydration of octyl alcohol) 14.4 parts of liquid sulfur dioxide, 1.6 parts of ethyl alcohol, 2 parts of 3% hydrogen peroxide, and 5 parts of "aged" paraldehyde, was allowed to stand in a pressure vessel for about 18 hours at room temperature. The yield of condensation product obtained was 4 parts. This product was at first rather pliable but finally set to a very hard product. It was soluble in acetone but not in other common organic solvents. It became opaque at 100° C. and melted with decomposition at 175–200° C. Upon analysis it was found to contain 17.82% sulfur as compared to a calculated amount of 18.18% for a product of the formula $(C_8H_{16}SO_2)_n$.

*Example XVII.*—To a mixture of liquid 2-methylpropene (isobutylene) and 14.4 parts of liquid sulfur dioxide in a pressure vessel was added 1.6 parts of ethanol and 1 part of 3% aqueous hydrogen peroxide. The vessel was sealed, the reaction mixture allowed to stand for 12 hours, the vessel then opened, and 1 part of aged paraldehyde added. The vessel was again sealed and allowed to stand for about one hour. The polymer isolated was a white amorphous powder, quite brittle and insoluble in common organic solvents. A yield of 90% of the theoretical was obtained. This product, having a melting point of 340° C., was found to contain 39.6% carbon and 7.0% hydrogen, whereas the calculated amounts for a polysulfone of the formula $(CH_3C_3SO_2)_n$ are 40.0% and 6.7%, respectively.

*Example XVIII.*—Into a vessel cooled in a carbon dioxide-acetone bath there were charged 30 parts of allyl acetate, 26 parts of sulfur dioxide, and a solution of 0.3 part of benzoyl peroxide, in 11 parts of absolute ethyl alcohol. The vessel was closed and stored at room temperature for 17 days during which time a white amorphous solid formed. The product was washed and purified. It weighed 13 parts which corresponds to 26.5% of the theoretical yield. The polymer fused to a semi-transparent, brittle article when heated at 145° C. in a compression mold.

Ascaridole, a naturally occurring terpene peroxide, is suitable for use as a catalyst in the process of the present invention, being particularly effective with the so-called primary olefines, i. e., those in which the ethylenic linkage is at the end of the carbon chain, but rather less effective with the secondary olefines, i. e., those in which the ethylenic linkage is at the 2 position. This is shown by the data in Table I below, wherein is given the amounts of polymer obtained by reacting comparable quantities of various primary and secondary olefines with 7.2 parts of liquid sulfur dioxide, 0.8 part of ethanol and 0.2 part of ascaridole. These materials were allowed to stand in a sealed vessel at about 25° C. for 5 hours; the reaction mixture then being poured into ethanol after which the precipitated polysulfone was filtered off, washed with alcohol, and dried. In this manner, the various olefins were reacted with sulfur dioxide to give the yields indicated in the following table:

Table I

| Olefin | Yield of Polymer |
|---|---|
| | Parts |
| Cyclohexene (secondary) | 0.2 |
| Pentene-1 (primary) | 4.0 |
| Pentene-2 (secondary) | 0.1 |
| Styrene (primary) | 0.5 |

It will be understood that the above examples are merely illustrative of various specific embodiments of the invention. The proportion of sulfur dioxide to olefin can be varied since an excess of either reactant can be removed without difficulty. Since the olefin and sulfur dioxide react in equimolar proportions, it is economical to use them in such proportions.

It should be noted that the olefins herein considered are mono-olefins having at least two ethylenic hydrogen atoms and having the ethylenic linkage in the −1 or the −2 position. In so far as applicants are aware, the polysulfones obtained by reacting sulfur dioxide with 3-methylcyclohexene, 3-cyclohexylpropene-1, methallyl alcohol, nonene-1, octene-1, styrene, allyl acetate, o-allyl anisole, o-allyl phenol, allyl cyanide, allyl acetic acid, undecylenyl alcohol, undecylenic acid, and methyl undecylenate, all readily made according to the process of the present invention, are entirely new compositions of matter never made heretofore. By using a mixture of these mono-olefins interpolymer polysulfones are obtained.

The examples have illustrated numerous peroxide-containing catalysts particularly adapted for use in the present process. As the activity of these catalysts varies somewhat with respect to specific olefins, the choice of a specific catalyst in any given instance will be influenced by the olefin to be reacted.

Hydrogen peroxide, benzoyl peroxide, and peroxide-containing aldehydes, or their mixtures, are preferred because of their relative cheapness and availability. Ascaridole, in the presence of alcohols, is also very active as a catalyst with mono-olefins, in some instances promoting condensation thereof with sulfur dioxide to an appreciably greater extent than the other catalysts herein considered.

The catalysts may be used in pure form or in solution in non-reactive solvents. Hydrogen peroxide is conveniently used as the ordinary 3% aqueous solution although more concentrated solutions may be used. Liquid catalysts such as aldehydes and ascaridole are conveniently used in undiluted form but may be introduced into the reaction mixture in non-reactive solvents such as aliphatic or aromatic hydrocarbons, ethers, or alcohols. It is preferred to dissolve solid catalysts such as benzoyl peroxide in a non-reactive solvent although they may be added to the reaction mixture in powdered form.

The proportions of catalyst may be varied considerably. Aldehydes are preferably employed in volumes of 5–10% of that of the olefin but larger proportions are advisable when the aldehyde contains only very small proportions of peroxide. Aqueous hydrogen peroxide is advantageously used in the proportion of 0.3 to 0.5 part by weight of pure hydrogen peroxide for each 100 parts by weight of the olefin. Benzoyl peroxide and other catalysts are preferably employed in ratios of from 1–2 parts by weight to 100 parts by weight of the olefin.

The proportion of alcohol present in the reaction likewise may be varied over considerable limits. For example, one part by volume of alcohol to 10 parts by volume of the combined olefin and sulfur dioxide may be used with satisfactory results. Even minute quantities of alcohol produce detectible results. Amounts of ¾ to 1 volume of alcohol per volume of the combined olefin and sulfur dioxide are particularly useful since, in addition to conferring the advantages of higher yield and better quality already discussed, they also enable the production of the product in a friable, easily handled mass. Even higher amounts of alcohol can be used but are often undesirable since yields may be somewhat reduced thereby.

Preferably, the process is carried out under pressure in closed vessels but pressures are not critical. The reaction may be carried out at atmospheric pressure although means should be provided to minimize loss of reactants by volatilization. The pressure range above atmospheric is limited only by the apparatus available.

The reaction temperatures are not critical. It is practical to use liquid reactants and to allow the reaction mixtures to come back slowly to room temperatures in a sealed vessel. The reaction temperature is, however, limited on the upper side by the stability of the reactants and the polysulfones being formed, temperatures causing decomposition of the reactants or the polysulfones not being satisfactory.

Ordinarily, a reaction period of a few hours is sufficient although better yields are frequently obtained by letting the reaction mixtures stand for several days or a week.

The present invention is applicable to the preparation of polymeric olefin-sulfur dioxide condensation products which, either alone or modified with the various modifying agents as synthetic resins, cellulose derivatives, waxes, fillers, pigments, dyes, plasticizers, and the like, are useful as molding compositions, especially in the manufacture of low cost construction elements such as box boards, window frames, and elements for cabinet work. These resins are also useful as coating compositions, when dissolved in suitable solvents, for coating surfaces such as wood, metals, glass, textiles, paper, and various types of masonry. The higher melting and more insoluble polysulfones are also useful as pigments and fillers.

An advantage of the present invention is that it provides a process of preparing olefin-sulfur dioxide condensation products in better yields and better quality, more cheaply and more conveniently than heretofore possible. Furthermore, it provides a method of condensing sulfur dioxide with olefins which heretofore had been non-reactive with sulfur dioxide and hence provides a method of preparing new and useful polysulfones.

As many apparently widely different embodiments of this invention may be made without departing from the spirit and scope thereof, it is to be understood that the invention is not lim- 2,201,544 ited to the specific embodiments thereof except as defined in the appended claims.

We claim:

1. Process of preparing olefin-sulfur dioxide polysulfones which comprises reacting sulfur dioxide with a mono-olefin having the formula $$HC=CH$$
$$\mid \quad \mid$$
$$Y \quad Z$$

in which Y represents a radical from the group consisting of hydrogen, methyl, and hydroxymethyl and, with Z, a saturated divalent hydrocarbon radical containing less than 7 carbon atoms, and Z represents a radical from the group consisting of hydrogen and alkyl radicals and, with Y, a saturated divalent hydrocarbon radical containing less than 7 carbon atoms, in the presence of ascaridole and a monomeric alcohol miscible with the reactants and liquid at the reaction temperature.

2. Process of preparing olefin-sulfur dioxide polysulfones which comprises reacting sulfur dioxide with a mono-olefin having the formula $$HC=CH$$
$$\mid \quad \mid$$
$$Y \quad Z$$

in which Y represents a radical from the group consisting of hydrogen, methyl, and hydroxymethyl and, with Z, a saturated divalent hydrocarbon radical containing less than 7 carbon atoms, and Z represents a radical from the group consisting of hydrogen and alkyl radicals and, with Y, a saturated divalent hydrocarbon radical containing less than 7 carbon atoms, in the presence of ascaridole and a lower aliphatic alcohol.

3. Process of preparing olefin-sulfur dioxide polysulfones which comprises reacting sulfur dioxide with a mono-olefin having the formula $$HC=CH$$
$$\mid \quad \mid$$
$$Y \quad Z$$

in which Y represents a radical from the group consisting of hydrogen, methyl, and hydroxymethyl and, with Z, a saturated divalent hydrocarbon radical containing less than 7 carbon atoms, and Z represents a radical from the group consisting of hydrogen and alkyl radicals and, with Y, a saturated divalent hydrocarbon radical containing less than 7 carbon atoms, in the presence of ascaridole and a lower aliphatic alcohol, the proportion of alcohol not exceeding, by volume, the volume of the combined mono-olefin and sulfur dioxide.

4. Process of preparing olefin-sulfur dioxide polysulfones which comprises reacting sulfur dioxide with a mono-olefin having the formula $$HC=CH$$
$$\mid \quad \mid$$
$$Y \quad Z$$

in which Y represents a radical from the group consisting of hydrogen, methyl, and hydroxymethyl and, with Z, a saturated divalent hydrocarbon radical containing less than 7 carbon atoms, and Z represents a radical from the group consisting of hydrogen and alkyl radicals and, with Y, a saturated divalent hydrocarbon radical containing less than 7 carbon atoms, in the presence of ascaridole.

5. Process as set forth in claim 1 in which the mono-olefin is further characterized as being a primary mono-olefin.

6. Process as set forth in claim 4 in which the mono-olefin is further characterized as being a primary olefin.

7. Process of preparing an olefin-sulfur dioxide polysulfone which comprises reacting sulfur dioxide with pentent-1 in the presence of ascaridole.

8. Process of preparing an olefin-sulfur dioxide polysulfone which comprises reacting sulfur dioxide with styrene in the presence of ascaridole.

9. Process of preparing an olefin-sulfur dioxide polysulfone which comprises reacting sulfur dioxide with methallyl alcohol in the presence of ascaridole.

DONALD S. FREDERICK.
CARL S. MARVEL.

CERTIFICATE OF CORRECTION.

Patent No. 2,201,544. May 21, 1940.

CARL S. MARVEL, ET AL.

It is hereby certified that error appears in the printed specification of the above numbered patent requiring correction as follows: Page 3, second column, line 34, Example XVII, before "liquid" insert --6 parts of--; page 5, second column, line 33, claim 7, for "pentent-1" read --pentene-1--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.